July 21, 1959 — J. E. CAVENEY — 2,896,009
WIRING DUCT
Filed May 17, 1955

INVENTOR.
Jack E. Caveney
BY
William P. Porcelli
Agent

United States Patent Office 2,896,009
Patented July 21, 1959

2,896,009
WIRING DUCT
Jack E. Caveney, Chicago, Ill.
Application May 17, 1955, Serial No. 508,843
5 Claims. (Cl. 174—72)

This invention relates to improvements in wiring ducts used to contain or surround wires in connection with wiring control panels or other wired installations where a large number of wires are used.

It is the general practice to harness or cover groups or bunches of wires to provide protection for the wires and to provide a neat compact wire arrangement. Many different methods and structures have been employed, such as wrapping with twine or wire or encasing with covers of some sort, all of which have had certain shortcomings.

It is the principal object of this invention to provide an improved wiring duct which overcomes many of the disadvantages of others.

It is another object to provide a wiring duct which has means for retaining wires within it, but which permits wires to be easily introduced or removed from it.

It is still another object to provide a wiring duct which entirely encircles the wires for protection while still providing openings for easily inserting or removing wires.

It is another object of the invention to provide a wiring duct which can be used with a cover plate for increased protection and better appearance, but which can also be used to advantage without a cover plate and without the chance of wires falling out.

It is another object of the invention to provide a wiring duct which facilitates extracting wires at points along the length of the duct.

It is another object to provide a convenient spring clip structure for holding a cover plate in position on the wiring duct.

These and other objects of the invention will be apparent to persons skilled in the art from a study of the following description and accompanying drawings, in which.

Figure 1:
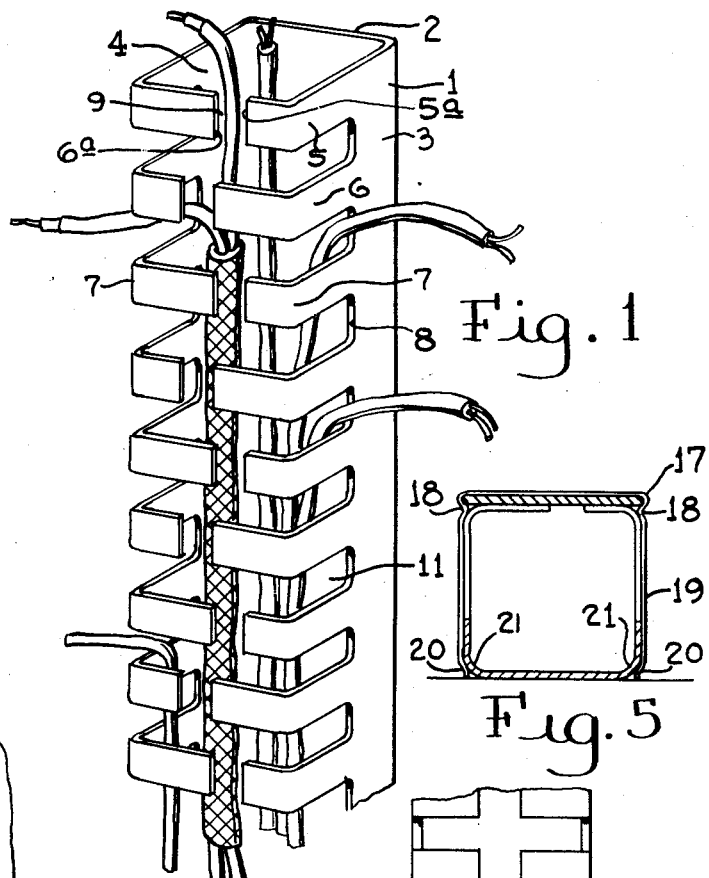
Fig. 1 is a perspective view of a length of a preferred form of the invention shown encircling a group of wires in a manner of its use.
Figure 2:
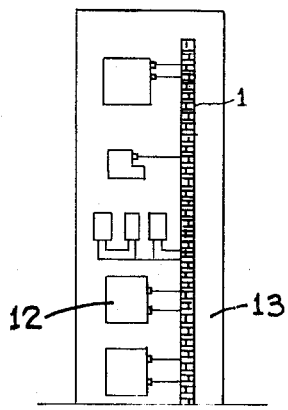
Fig. 2 shows a front elevation of a typical electrical control panel on which the wiring duct can be used to advantage.
Figure 5:
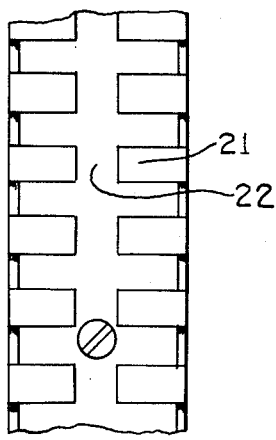
Fig. 5 shows a sectional view along the lines 5—5 of Fig. 3.

With reference in more detail to the drawings, a preferred embodiment of the invention comprises a channel 1 provided with a continuous bottom wall 2 connected to two side walls 3 and 4 extending normally thereto. Connected to the outer edges 8 of these side walls 3 and 4 are fingers 5 and 6, fingers 5 being shorter than fingers 6 but both being provided with right angle bends 7 in longitudinal alignment with each other. The fingers 5 and 6 are arranged alternately along opposite sides of the channel 1 so that a short finger 5 extending from the wall 3 is opposite a long finger 6 extending from the wall 4 and, likewise, a long finger 6 extending from the wall 3 is opposite a short finger 5 extending from the wall 4. These fingers 5 and 6 are short enough that a gap 9 is provided between their outer tips 5a and 6a. Because the fingers 5 and 6 are placed alternately along the channel 1, these gaps 9 are arranged alternately on opposite sides of the longitudinal center line of the channel 2 so that each alternate gap 9 is offset laterally with the one next to it and in alignment with every other one so that a zig-zag passage is provided for accommodating wires. Even though all of the ends 6a appear to be in longitudinal alignment with each other, they could just as well slightly overlap the longitudinal center line of the channel 1.

Figure 3:
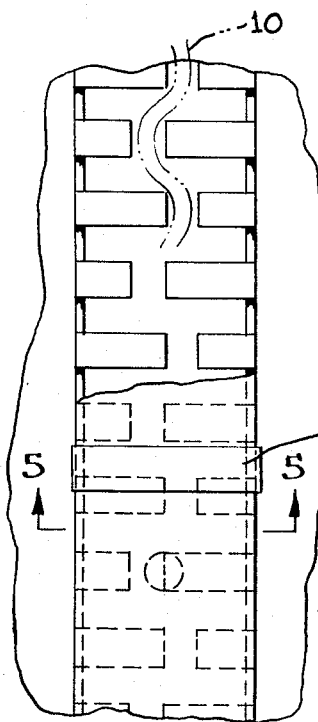
Fig. 3 shows a partially cutaway portion of a plan view of the wiring duct embodiment shown in Fig. 1.
Figure 4:
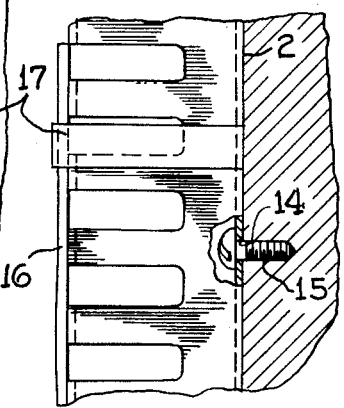
Fig. 4 shows a right side view in partial section of the wiring duct shown in Fig. 3.

As is particularly indicated in Fig. 3, a wire 10 must be curved somewhat sinusoidally in order to get it placed within the interior of the channel 1. It must be bent to conform to the passage provided by the positions of the offset gaps 9. After a wire 10 is contained within the channel 1, it cannot fall out of its own accord since its normal shape is that of a straight line rather than a sharp bend or curve as required for its removal.

Fig. 1 shows the channel 1 with several wires contained within it. It is customary to draw off or extract certain wires from the group within the channel 1 at random positions along the length of the duct. Because a space 11 is provided between the fingers 5 and 6 on either side of the channel 1, wires can be easily brought out through these spaces 11 and led into the units 12 to which they are attached when mounted, for example, on a control panel 13. All of the spaces 11 between the fingers 5 and 6 as well as the gaps 9 between their outer ends 5a and 6a are preferably wider than the diameters of the wires placed within the channel 1 in order to permit positioning of the wires between the fingers 5 and 6 along the walls 3 of the channel 1 and between the finger ends 5a and 6a.

In order to mount the duct 1 onto the control panel 13 or other wall or board, holes 14 are provided in the bottom wall 2 of the duct through which screws 15 may be passed and fastened to the panel 13.

If desired, a cover plate 16 can be positioned across the end portions of the fingers 5 and 6 to cover the openings and gaps 9 along the outer side of the duct. This cover 16 is preferably held in place by means of spring clips 17 which are of a U-shape and which are provided with inwardly extending ribs 18 which snap over the sides of the cover 16 to hold the clip positioned thereon. The arms 19 of the clip extend downwardly along the sides of the duct 1 and are provided with inwardly extending ends 20 which conform to the curvature of the inner curves 21 of the duct. No special tools are required to remove these clips to remove the cover and it is a simple task to snap these spring clips 17 in position. As many of these clips as may be found necessary can be used in order to properly retain the cover 16 in place.

Figure 6:
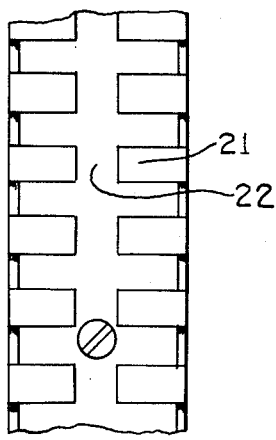
Fig. 6 shows a plan view of an alternate wiring duct construction.

Fig. 6 shows an alternate structure for the wiring duct. The essential difference is that its fingers 21 are all of the same length and provide aligned gaps 22 between them as clearance for passing wires in and out of the duct. The gaps 22 between the ends of the fingers 21, as well as the longitudinal spaces between the fingers 21, as in the case of the first embodiment shown, are preferably wider than the diameters of the wires placed within the wiring duct in order to permit positioning of the wires between the fingers 21 and between the finger ends. This alternate construction has an advantage in so far as the wires need not be kinked or otherwise bent in order to place them in or out of the duct. However, it is more desirable to use a cover 16 with this form of the invention since the gaps 22 are in alignment.

Although the wiring duct has been shown in a particular manner, it will be obvious to persons skilled in the art that it may be constructed in a different manner with slight modifications without departing from the scope of the appended claims defining the invention.

I claim:

1. A wiring duct comprising a channel having a bottom wall and side walls and fingers extending from the side walls, said fingers being spaced from each other longitudinally and unequally spaced from each other laterally.

2. A wiring duct comprising a channel having a bottom wall connected between side walls, said side walls having inwardly bent fingers which are longitudinally separate and in transverse rows of two and laterally spaced from each other at their ends, said lateral spacing of the fingers being alternately closer to one side of the channel and then the other.

3. A wiring duct comprising a channel having a bottom wall connected between side walls, said side walls having inwardly bent fingers which are arranged in rows of twos and laterally spaced from each other at their ends, said laterally spacing being alternately closer to one side of the channel and then the other for each successive row.

4. A wiring duct comprising a channel having a bottom wall connected between side walls, each side wall having a row of inwardly extending bent fingers of two different lengths placed alternately, the longer length fingers in one row being opposite the shorter length fingers in the other row.

5. A wiring duct comprising a channel having a bottom wall connected between side walls, each side wall having a row of inwardly extending bent fingers of two different lengths placed alternately, the longer length fingers in one row being opposite the shorter length fingers in the other row and laterally spaced from each other at their ends to provide an irregular passage for the accommodation of wires.

References Cited in the file of this patent

UNITED STATES PATENTS

| | | |
|---|---|---|
| 1,094,109 | Alpaugh | Apr. 21, 1914 |
| 1,668,953 | Erickson | May 8, 1928 |